(12) United States Patent
Poole et al.

(10) Patent No.: US 9,045,655 B2
(45) Date of Patent: Jun. 2, 2015

(54) COATING FOR DECORATIVE METALS WITH IMPROVED MAR AND SCRATCH RESISTANCE AND METHODS OF APPLICATION

(75) Inventors: James E. Poole, Gibsonia, PA (US); Anthony D. Kulfan, Mars, PA (US); Raphael O. Kollah, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 846 days.

(21) Appl. No.: 12/850,135

(22) Filed: Aug. 4, 2010

(65) Prior Publication Data

US 2010/0294668 A1 Nov. 25, 2010

Related U.S. Application Data

(62) Division of application No. 11/776,102, filed on Jul. 11, 2007, now abandoned.

(51) Int. Cl.
  *C09D 5/44* (2006.01)
(52) U.S. Cl.
  CPC ............ *C09D 5/4488* (2013.01); *Y10T 428/259* (2015.01); *Y10T 428/269* (2015.01); *Y10T 428/25* (2015.01)
(58) Field of Classification Search
  CPC ...................................................... C09D 5/4488
  USPC ............................................. 427/212, 216, 219
  See application file for complete search history.

(56) References Cited

U.S. PATENT DOCUMENTS

| | | | |
|---|---|---|---|
| 4,247,708 A * | 1/1981 | Tsutsumi et al. | 556/456 |
| 4,956,240 A | 9/1990 | Williams et al. | 428/423.7 |
| 5,063,254 A | 11/1991 | Nakos | 522/43 |
| 6,387,519 B1 | 5/2002 | Anderson et al. | 428/447 |
| 2003/0224174 A1 * | 12/2003 | White et al. | 428/413 |
| 2006/0089419 A1 | 4/2006 | Hogge et al. | 522/174 |
| 2009/0264975 A1 * | 10/2009 | Flanagan et al. | 623/1.2 |

FOREIGN PATENT DOCUMENTS

| | | |
|---|---|---|
| EP | 0 273 698 A2 | 7/1988 |
| EP | 0 322 150 A2 | 6/1989 |

OTHER PUBLICATIONS

Papa John's Toolbox, www.hobbytool.com/buffing.htm.

* cited by examiner

*Primary Examiner* — Tabatha Penny
(74) *Attorney, Agent, or Firm* — William J. Uhl

(57) ABSTRACT

Coated articles comprising a decorative metal substrate and a transparent cured coating thereon containing inorganic particles in which the concentration of particles in the exposed surface region of the cured coating is greater than the bulk region of the coating. Preferably, the transparent coating is applied by electrodeposition.

14 Claims, 1 Drawing Sheet

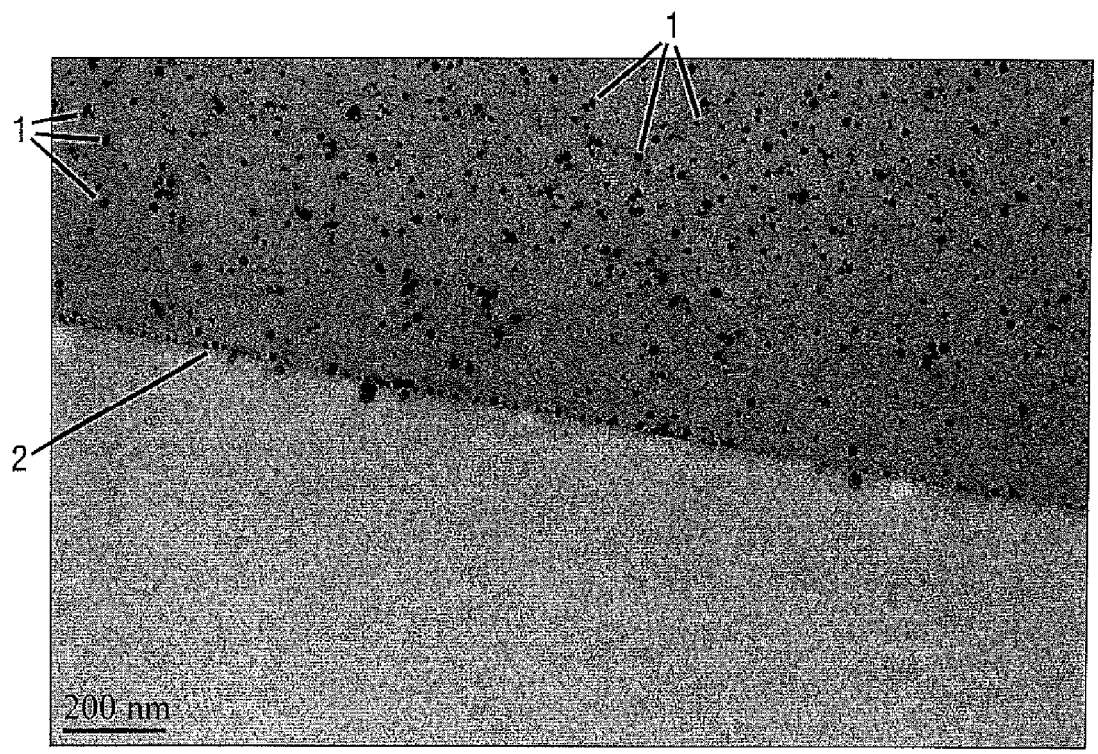

COATING FOR DECORATIVE METALS WITH IMPROVED MAR AND SCRATCH RESISTANCE AND METHODS OF APPLICATION

CROSS-REFERENCE TO RELATED APPLICATION

This application is a division of U.S. patent application Ser. No. 11/776,102, filed on Jul. 11, 2007.

FIELD OF THE INVENTION

The present invention relates to coated articles, particularly decorative articles, and to methods for coating the articles by electrodeposition such that the articles have improved mar and scratch resistance.

BACKGROUND OF THE INVENTION

Decorative metals, such as brass, bronze, polished steel and aluminum, and articles derived therefrom, such as hardware and jewelry, aluminum and steel trim parts, are often coated with a clear or tinted transparent coating to enhance the durability and weatherability of the article. A disadvantage of many of these protective coatings is that they have poor mar and scratch resistance.

The present invention provides a coated decorative metal substrate with improved mar and scratch resistance and applying by electrodeposition a coating that provides improved mar and scratch resistance.

SUMMARY OF THE INVENTION

The present invention provides a coated article comprising:
(a) a decorative substrate,
(b) a transparent coating thereon containing inorganic particles in which the concentration of particles in the exposed surface region of the coating is greater than the concentration of the particles in the bulk regions of the coating.

The invention also provides a method of forming an abrasion-resistant coating on an electroconductive substrate comprising:
(a) electrodepositing onto the substrate a curable electrodepositable composition comprising:
  (i) a curable resinous binder,
  (ii) inorganic particles,
  (iii) a surface active agent;
(b) curing the composition to form a substantially continuous coating on the substrate with a surface exposed to the atmosphere while the inorganic particles migrate to the exposed surface region of the coating.

DETAILED DESCRIPTION OF THE DRAWINGS

The drawing is a transmission electron photomicrograph 13,000× magnification of a cross-section of a cured electrodeposited coating of Example 1, infra.

DETAILED DESCRIPTION

The decorative substrates of the invention have a bright shiny appearance as measured by their specular reflectance. The specular reflectance can be determined by measuring the specular gloss in accordance with ASTM D2457, D523 using a BYK GARDNER, RTM HAZE-GLOSSMETER. Accordingly, when the specular gloss is determined by this method at a 60° incident angle (60° specular gloss), the gloss readings are greater than 100, typically greater than 200, often greater than 300 and greater than 400. Preferably, the decorative substrates are electroconductive and are metals. Examples of such decorative metals are polished steel and aluminum, copper, polished bronze, brass, precious metals such as gold and silver, and substrates that have been plated or coated to give a bright shiny metal appearance such as chrome plated steel or nickel plated steel and copper plated substrates.

The decorative metals find use in applications such as bright hardware, for example, brass doorknobs, mail receptacles, precious metal jewelry, aluminum and steel trim parts for automotive applications.

As mentioned above, the decorative substrates are preferably electroconductive which permits the application of the protective coating by electrodeposition. However, the protective coating can be applied by more conventional techniques such as spraying, immersion coating and roll coating. In the latter case, the substrate need not be electroconductive.

The coating composition that is applied to the decorative metal comprises a curable resinous binder, inorganic particles and a surface active agent. The resinous binder contains a film-forming resin having reactive functional groups and a curing agent having functional groups that are reactive with the functional groups of the film-forming resin. The film-forming resin and curing agent can be contained in one resinous binder that has different coreactive functional groups. For example, a resinous binder containing hydroxyl groups and blocked isocyanate groups.

The film-forming resin is preferably ionic such that the curable resinous composition can be applied by electrodeposition. The resin can be anionic or cationic and is preferably cationic in nature.

Examples of film-forming resins suitable for use in anionic electrodepositable coating compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids such as hydroxyethyl acrylate and/or hydroxymethyl methacrylate, unsaturated carboxylic acids such as acrylic or methacrylic acid, and at least one other ethylenically unsaturated monomer such as lower alkyl esters of acrylic and methacrylic acid, for example, ethyl acrylate and butyl methacrylate. Such interpolymers or resins are commonly referred to as (meth)acrylic resins. Still another suitable electrodepositable resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference. Other acid functional polymers can also be used such as phosphatized polyepoxide or phosphatized acrylic polymers as are well known to those skilled in the art.

As aforementioned, it is preferred that the ionic electrodepositable resin (a) is capable of deposition on a cathode. Examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157. Besides cationic amine salt group containing resins, sulfonium salt group containing resins can also be used. Examples of such resins are sulfonium group containing (meth)acrylic resins as disclosed in U.S. Pat. No. 4,038,232.

Examples of suitable curing agents are aminoplasts that are reactive with hydroxyl groups and carboxylic acid groups associated with a film-forming resin and are the preferred curing agent for anionic film-forming resins. Other curing agents are polyisocyanates that are reactive with hydroxyl groups and primary and secondary amine groups associated with the film-forming resin and are preferably curing agents for cationic film-forming resins.

Aminoplast resins are well known in the art. Aminoplasts can be obtained from the condensation reaction of formaldehyde with an amine or amide. Nonlimiting examples of amines or amides include melamine, urea, or benzoguanamine. While the aldehyde used is most often formaldehyde, other aldehydes such as acetaldehyde, crotonaldehyde, and benzaldehyde can be used.

The aminoplast contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example from Cytec Industries, Inc. under the trademark CYMEL®, and from Solutia, Inc. under the trademark RESIMENE®.

Other curing agents suitable for use include, but are not limited to, polyisocyanate curing agents. As used herein, the term "polyisocyanate" is intended to include blocked (or capped) polyisocyanates as well as unblocked polyisocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams.

The particles suitable for use in the coating compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example boron nitride; specific, nonlimiting examples of metal oxides are, for example zinc oxide; nonlimiting examples of suitable metal sulfides are, for example molybdenum disulfide, tantalum disulfide, tungsten disulfide, and zinc sulfide; nonlimiting suitable examples of metal silicates are, for example aluminum silicates and magnesium silicates such as vermiculite.

The particles can comprise, for example a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. Since the cured composition of the invention is employed as a transparent coating, the inorganic particles should not seriously interfere with the optical properties of the cured composition. As used herein, "transparent" means that the cured coating has a BYK Haze index of less than 50, more typically less than 25, as measured using a BYK/Haze Gloss instrument.

Preferably, the inorganic particles are colloidal silica particles in situ by a sol-gel process in which alkoxy silanes are hydrolyzed in alcohol/water mixture to form colloidal silica particles in situ.

The inorganic particles have an average particle size of less than 1000 nanometers, typically from 1 to 100, and from 1 to 50 nanometers, and often from 5 to 25 nanometers.

The average particle size can be determined by visually examining an electron micrograph of a transmission electron microscopy ("TEM") image, measuring the diameter of the particles in the image, and calculating the average particle size based on the magnification of the TEM image. For example, a TEM image with 105,000× magnification is produced, and a conversion factor is obtained by dividing the magnification by 1000. Upon visual inspection, the diameter of the particles is measured in millimeters, and the measurement is converted to nanometers using the conversion factor. The diameter of the particle refers to the smallest diameter sphere that will completely enclose the particle.

The shape (or morphology) of the particles can vary depending upon the specific embodiment of the present invention and its intended application. For example generally spherical morphologies (such as solid beads, microbeads, or hollow spheres), can be used, as well as particles that are cubic, platy, or acicular (elongated or fibrous).

The inorganic particles have a Mohs' hardness value greater than 5, more typically greater than 6.

Also present in the coating composition is a surface active agent that can be present as a separate component or can be prereacted with the inorganic particles.

The surface active agent can be selected from anionic, nonionic, and cationic surface active agents.

As used herein, by "surface active agent" is meant any material that tends to lower the solid surface tension or surface energy of the cured composition or coating. That is, the cured composition or coating formed from a composition comprising a surface active agent has a lower solid surface tension or surface energy than a cured coating formed from the analogous composition which does not contain the surface active agent.

Nonlimiting examples of suitable anionic surface active agents include sulfates or sulfonates. Specific nonlimiting examples include higher alkyl mononuclear aromatic sulfonates such as the higher alkyl benzene sulfonates containing from 10 to 16 carbon atoms in the alkyl group and a straight- or branched-chain, e.g., the sodium salts of decyl, undecyl, dodecyl, tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate.

Nonlimiting examples of nonionic surface active agents suitable for use in the cured composition or coating of the present invention include those containing ether linkages and which are represented by the following general formula: RO(R'O)$_n$H; wherein the substituent group R represents a hydrocarbon group containing 6 to 60 carbon atoms, the substituent group R' represents an alkylene group containing 2 or 3 carbon atoms, and mixtures of any of the foregoing, and n is an integer ranging from 2 to 100, inclusive of the recited values.

Such nonionic surface active agents can be prepared by treating fatty alcohols or alkyl-substituted phenols with an excess of ethylene or propylene oxide. The alkyl carbon chain may contain from 14 to 40 carbon atoms and may be derived from a long chain fatty alcohol such as oleyl alcohol or stearyl alcohol. Nonionic polyoxyethylene surface active agents of the type represented by the formula above are commercially available under the general trade designation SURFYNOL from Air Products Chemicals, Inc.; PLURONIC or TETRONIC from BASF Corporation; TERGITOL from Union Carbide; and SURFONIC from Huntsman Corporation.

As indicated above, cationic surface active agents also can be used. Nonlimiting examples of cationic surface active agents suitable for use in the cured compositions or coatings of the present invention include acid salts of alkyl amines such as ARMAC HT, an acetic acid salt of n-alkyl amine available from Akzo Nobel Chemicals; imidazoline derivatives such as CALGENE C-100 available from Calgene Chemicals Inc.; ethoxylated amines or amides such as DETHOX Amine C-5, a cocoamine ethoxylate available from Deforest Enterprises; ethoxylated fatty amines such as ETHOX TAM available from Ethox Chemicals, Inc.; and glyceryl esters such as LEXEMUL AR, a glyceryl stearate/stearaidoethyl diethylamine available from Inolex Chemical Co.

When the coating compositions contain anionic film-forming resins, anionic or non-ionic surface active agents should be used. When the coating compositions contain cationic film-forming resins, cationic or non-ionic surface active agents should be used.

Preferably, the surface active agent is selected from at least one polysiloxane comprising at least one reactive functional group, the at least one polysiloxane comprising at least one of the following structural units (I):

wherein each R$^1$, which may be identical or different, represents H, OH, a monovalent hydrocarbon group or a monovalent siloxane group; each R$^2$, which may be identical or different, represents a group comprising at least one reactive functional group, wherein m and n fulfill the requirements of $0<n<4$, $0<m<4$ and $2\leq(m+n)<4$.

It should be understood that the "at least one polysiloxane having at least one structural unit (I) above is a polymer that contains at least two Si atoms per molecule. As set forth above, the term "polymer" in meant to encompass oligomers, and includes without limitation both homopolymers and copolymers. It should also be understood that the at least one polysiloxane can include linear, branched, dendritic or cyclic polysiloxanes.

Also, as used herein, the term "reactive" refers to a functional group that forms a covalent bond with another functional group under conditions sufficient to cure the composition.

Each of m and n depicted in the at least one structural unit (I) above fulfill the requirements of $0<n<4$, $0<m<4$ and $2\leq(m+n)<4$. When (m+n) is 3, the value represented by n can be 2 and the value represented by m is 1. Likewise, when (m+n) is 2, the value represented by each of n and m is 1.

As used herein, a "monovalent hydrocarbon group" means a monovalent group having a backbone repeat unit based exclusively on carbon. As used herein, "monovalent" refers to a substituent group that, as a substituent group, forms only one single, covalent bond. For example a monovalent group on the at least one polysiloxane will form one single covalent bond to a silicon atom in the backbone of the at least one polysiloxane polymer. As used herein, "hydrocarbon groups" are intended to encompass both branched or unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example oxygen, nitrogen, and halogen atoms.

As used herein, "siloxane" means a group comprising a backbone comprising two or more —SiO— groups. For example, the siloxane groups represented by R$^1$, which is discussed above, and R, which is discussed below, can be branched or unbranched, and linear or cyclic. The siloxane groups can be substituted with pendant organic substituent groups, for example alkyl, aryl, and alkaryl groups. The organic substituent groups can be substituted with heteroatoms, for example oxygen, nitrogen, and halogen atoms, reactive functional groups, for example those reactive functional groups discussed above with reference to R$^2$, and mixtures of any of the foregoing.

In another embodiment, each substituent group R$^2$, which may be identical or different, represents a group comprising at least one reactive functional group such as a hydroxyl group or a carboxyl group.

In one embodiment, the present invention is directed to a cured composition as previously described, wherein the at least one polysiloxane comprises at least two reactive functional groups such as hydroxyl groups. The at least one polysiloxane can have a reactive group equivalent weight ranging from 50 to 1000 mg, preferably 100 to 500 mg per gram of the at least one polysiloxane.

In one embodiment, the present invention is directed to a cured composition as previously described, wherein the at least one polysiloxane has the following structure (II) or (III):

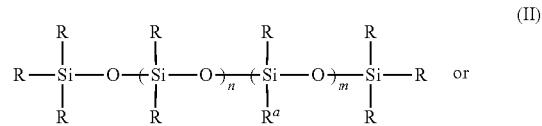

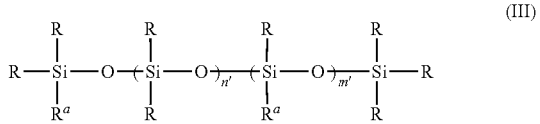

wherein: m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —$R^a$ comprises the following structure (IV):

wherein —$R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —$(CH_2)_3OCH_2C(CH_2OH)_2(CH_2CH_2—)$.

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-α,α-dimethylbenzyl isocyanate, such as —$(CH_2)_2C_6H_4$— and —$CH_2CH(CH_3)C_6H_3(C(CH_3)_2(NCO)$. As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol that is commercially available from Air Products and Chemicals, Inc. of Allentown, Pa. as SURFYNOL 104.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases, and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

The curable resinous binder is present in the composition in amounts of 80 to 99, more typically 85 to 99 percent by weight. The inorganic particles are present in the composition in amounts of 0.5 to 10, more typically 0.5 to 5 percent by weight, and the surface active agent is typically present in the coating composition in amounts of 0.5 to 10, more typically 2 to 12.5 percent by weight. The above percentages by weight are based on total solids weight of the composition.

When the coating compositions are applied by electrodeposition, they are in the form of an aqueous dispersion.

The term "dispersion" is believed to be a two-phase transparent, translucent or opaque system in which the solids of the composition is in the dispersed phase and the water is in the continuous phase. The average particle size of the solids phase is generally less than 1.0 and usually less than 0.5 microns, preferably less than 0.15 micron.

The concentration of the solids phase in the aqueous medium is at least 1 and usually from about 2 to about 60 percent by weight based on total weight of the aqueous dispersion.

The electrodeposition bath can be prepared by predispersing in water and optional co-diluents the curable resinous composition that includes the ionic film-forming resin and the crosslinking agent. Typically, the resin solids of this predispersion is about 60 to 80% by weight based on total weight of the dispersion. The dispersion can then be let down with additional water and optional co-diluent to form the electrodeposition bath. The inorganic particles and the surface active agent can be added to the predispersion or to the electrodeposition bath itself. Preferably, the inorganic particles are prereacted with the surface active agent and the prereacted material added to the resinous predispersion. Prereaction does not necessarily mean an actual chemical reaction between the inorganic particles and the surface active agent. It simply means that the two are mixed together followed by heating typically from 50 to 150° C. for 10 to 60 minutes to form a mixture which may be an actual reaction product which has been found to be more easily incorporated into the coating composition.

When the compositions of the present invention are in the form of electrodeposition baths, the solids content of the electrodeposition bath are usually within the range of about 5 to 25 percent by weight based on total weight of the electrodeposition bath.

As aforementioned, besides water, the aqueous medium may contain a co-diluent such as a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

The coating compositions can also contain dyes or transparent pigments to tint the coating without substantially affecting the transparency of the coating.

When the aqueous dispersions as described above are employed for use in electrodeposition, the aqueous dispersion is placed in contact with an electrically conductive anode and an electrically conductive cathode, with the surface to be coated being the cathode in cationic electrodeposition and the anode in anionic electrodeposition. As aforementioned, in the method of the present invention, it is preferred that the substrate serves as the cathode. Following contact with the aqueous dispersion, an adherent film of the coating composition is deposited on the substrate that is serving as an electrode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

When the compositions are cured, the inorganic particles migrate to the surface region of the cured composition such that the concentration in the surface region is greater than in the bulk region of the cured composition.

As used herein "surface region" of the cured composition means the region which is generally parallel to the exposed air-surface of the coated substrate and which has thickness generally extending perpendicularly from the surface of the cured coating to a depth ranging from at least 20 nanometers to 150 nanometers beneath the exposed surface. In certain embodiments, this thickness of the surface region ranges from at least 20 nanometers to 100 nanometers, and can range from at least 20 nanometers to 50 nanometers. As used herein, "bulk region" of the cured composition means the region which extends beneath the surface region and which is generally parallel to the surface of the coated substrate. The bulk region has a thickness extending from its interface with the surface region through the cured coating to the substrate or coating layer beneath the cured composition.

The concentration of particles in the cured composition can be characterized in a variety of ways. For example the average number density of particles (i.e., the average number or population of particles per unit volume) in the surface region is greater than the average number density in the bulk region. Alternatively, the average volume fraction (i.e., volume occupied by particles/total volume) or average weight percent per unit volume, i.e., (((the weight of particles within a unit volume of cured coating)/(total weight of the unit volume of cured coating))×100% of the particles in the surface region is greater than the average volume fraction or average weight percent of particles within the bulk region.

The concentration of particles (as characterized above) present in the surface region of the cured coating can be determined, if desired, by a variety of surface analysis techniques well known in the art, such as Transmission Electron Microscopy ("TEM"), Surface Scanning Electron Microscopy ("X-SEM"), Atomic Force Microscopy ("AFM"), and X-ray Photoelectron Spectroscopy.

For example the concentration of particles present in the surface region of the cured coating may be determined by cross-sectional transmission electron microscopy techniques. A useful transmission electron microscopy method is described generally as follows. A coating composition is applied to a substrate and cured. Samples of the cured coating are then removed or delaminated from the substrate and embedded in a cured epoxy resin using techniques as are well known in the art. The embedded samples then can be microtomed at room temperature using techniques well known in the art, such as by forming a block face. The sections can be cut using a 45° diamond knife edge mounted in a holder with a "boat cavity" to hold water. During the cutting process, sections float to the surface of the water in the boat cavity. Once a few cuts reach an interference color of bright to dark gold (i.e., approximately 100 to 150 nanometers thickness), individual samples typically are collected onto a formvar-carbon coated grid and dried at ambient temperature on a glass slide. The samples are then placed in a suitable transmission electron microscope, such as a Philips CM12 TEM, and examined at various magnifications, such as at 105,000× magnification, for documentation of particle concentration at the surface region, via electron micrography. The concentration of particles in a surface region of a cured coating can be ascertained upon visual inspection of the electron micrograph.

The coatings formed from the cured compositions according to the present invention can have outstanding initial scratch (mar) resistance properties, as well as post-weathering or "retained" scratch (mar) resistance, which can be evaluated by measuring the gloss of coated substrates before and after abrading of the coated substrates.

The initial 20° gloss of a coated substrate according to the present invention can be measured with a 20° NOVO-GLOSS 20 statistical glossmeter, available from Gardner Instrument Company, Inc. The coated substrate can be subjected to scratch testing by linearly scratching the coating or substrate with a weighted abrasive paper for ten double rubs using an Atlas AATCC Scratch Tester, Model CM-5, available from Atlas Electrical Devices Company of Chicago, Ill. The abrasive paper is 3M 281Q WETORDRY™ PRODUCTION™ 9 micron polishing paper sheets, which are commercially available from 3M Company of St. Paul, Minn. Panels are then rinsed with tap water and carefully patted dry with a paper towel. The 20° gloss is measured on the scratched area of each test panel. The number reported is the percent of the initial gloss retained after scratch testing, i.e., 100%× scratched gloss/initial gloss. Since the 20° gloss of a bright reflective coated substrate is somewhat meaningless, the 20° gloss is determined over a black substrate to which the coating compositions of the invention have been applied. For example, the substrate can be first coated with a coating composition containing an electroconductive black pigment such as carbon black followed by electrodeposition of the coating composition of the invention. When tested in this manner, the cured compositions have an initial 20° gloss (as measured using a 20° NOVO-GLOSS 20 statistical glossmeter, available from Gardner Instrument Company) of greater than 70 and retain at least 70% of their initial gloss after abrasion testing.

In addition, the cured coatings have a retained scratch resistance (as measured using the scratch test method described above after the unscratched test panels were subjected to simulated weathering by QUV exposure to UVA-340 bulbs in a weathering cabinet available from Q Panel Company) such that greater than 50 percent of initial 20° gloss is retained after weathering.

Illustrating the invention are the following examples, which, however, are not to be considered as limiting the invention to their details. Unless otherwise indicated, all parts and percentages in the following examples, as well as throughout the specification, are by weight.

EXAMPLES

Example A

Polysiloxane

This example describes the preparation of polysiloxane polyol, a product of the hydrosilylation of polysiloxane with an approximate degree of polymerization of 3 to 4, i.e. (Si—O)$_3$ to (Si—O)$_4$. The polysiloxane polyol was prepared as follows:

To a suitable reaction vessel equipped with a means for maintaining a nitrogen blanket, was added 1032.0 kg of trimethylolpropane monoallyl ether and 84.4 g of anhydrous sodium acetate. The mixture was sparged with nitrogen for 20 minutes with stirring at room temperature, and a solution of chloroplatinic acid (29.1 g in 570.0 g of isopropanol) was added, followed by 952.5 g of toluene. The mixture was heated to 80° C., and 680.4 kg of MASILWAX BASE 135 (polysiloxane containing silicon hydride, available from Emerald Performance Materials) was added over 5 hours and 30 minutes. The temperature was maintained at 80° C. until the silicon hydride peak at 2150 cm$^{-1}$ in the infrared spectrum was no longer observable.

Example B

Silica Dispersion

This Example describes a colloidal silica dispersion prepared as follows:

A suitable reaction vessel equipped for vacuum distillation was flushed with N$_2$. To the reaction flask was added 236.3 g of the polysiloxane polyol of Example A, 337.2 g of ORGANOSILICASOL MT-ST (colloidal silica available from Nissan Chemicals), and 129.4 g of methyl amyl ketone. The resulting mixture was vacuum distilled at 25° C. until 212.1 g of solvent had been removed. The mixture was heated to 40° C. for 2 hours, and then to 60° C. for an additional 2 hours. To the reaction flask was added 90.2 g of 4-methylhexahydrophthalic anhydride over 30 minutes. After completion of this addition, the mixture was heated to 90° C. When the anhydride peak at 1790 cm$^{-1}$ in the infrared spectrum was no longer observable, 175.9 g of CARDURA E-10 (neodecanoic acid glycidyl ester) was added over 2 hours. After the first 10 minutes of the addition, 0.75 g of benzyldimethylamine was added to the reaction vessel. The reaction temperature was maintained at 90° C. for about 16 hours, and then 13.56 g of CARDURA E-10 was added. After about 20 hours at 90° C. a final acid value of 11.5 was reached.

Example I

The colloidal silica dispersion of Example B was used to modify a cationic electrodepositable clear coating composition available from PPG Industries as ELECTROCLEAR 2700. The amino group-containing acrylic polymer and aminoplast curing agent were mixed with the silica dispersion of Example B. Lactic acid was added to the mixture to partially neutralize the amino group-containing acrylic polymer (70% TN) and the mixture dispersed in water to a 30% solids content. For use in an electrodeposition bath, the dispersions were further thinned with water to a solids content of fifteen (15) percent by weight.

Reference is made to the Fig., where it can be seen that the concentration of colloidal silica particles is greater at the surface 2 of the cured coating than in the bulk region. In other words, the concentration of the colloidal silica particles in the region extending from the exposed air-surface interface to a depth of 20 to 50 nanometers is greater than the concentration of the silica particles in the bulk region of the coating 3.

Example II

Control

For the purposes of control, unmodified ELECTROCLEAR 2700 was compared to Example I.

Cationic electrodeposition baths of Examples I and II were prepared. The baths had solids content of 15% by weight and bath conductivities of 700-900 microohms per centimeter at 27° C. Aluminum panels were electrodeposited in the baths at 130-250 volts for 30-90 seconds at a bath temperature of 26-32° C. Smooth continuous films were obtained. The films were cured at 177° C. for 30 minutes to produce tack-free coatings with good appearance.

Test Procedures:

Scratch resistance of the coated test panels was measured using the following method: Initial 20° gloss of the coated panels is measured with a 20° NOVO-GLOSS 20 statistical glossmeter, available from Gardner Instrument Company, Inc. Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Ill. The abrasive paper is 3M 2819 WET OR DRY PRODUCTION 9 micron polishing paper sheets available from the 3M Company. Panels were then rinsed with water and carefully patted dry. The 20° gloss was measured on the scratched area of each test panel. The number reported is the percent of the initial gloss retained after scratch testing, i.e., 100%×scratched gloss/initial gloss. Post-weathering scratch resistance (retained scratch resistance) was measured using the scratch test method described above after the unscratched test panels were subjected to simulated weathering by QUV exposure to UVA-340 bulbs in a weathering cabinet available by Q Panel Co. Testing was as follows: a cycle of 70° C. for 8 hours followed by 50° C. for 4 hours (total exposure time of 100 hours). The number reported is the percent of the initial gloss retained after retained scratch testing, i.e., 100× retained scratched gloss/initial gloss. The results are reported in Table 1 below.

TABLE 1

| Example | 20° Gloss (Initial) | % Initial 20° Gloss After Mar/Scratch Test | % Initial 20° Gloss Retained Post-weathering Mar/Scratch Test |
|---|---|---|---|
| I (Control) | 887 | 57.7% | 36.9% |
| II | 912 | 82.8% | 61.7% |

The results reported in Table 1 above illustrate that, compared with the control, the electrocoating multi-component compositions of the invention of Example II provide coatings with better initial and retained scratch resistance after simulated weathering testing.

The invention claimed is:

1. A method of forming an abrasion-resistant coating on an electroconductive substrate comprising:
   (a) electrodepositing onto the substrate a curable electrodepositable composition comprising:
      (i) a curable resinous binder,
      (ii) inorganic particles,
      (iii) a surface active agent;
   (b) curing the composition to form a substantially continuous coating on the substrate with a surface exposed to the atmosphere while the inorganic particles migrate to the exposed surface region of the coating.

2. The method of claim 1 in which the curable resinous binder comprises:
   (a) an ionic film-forming resin containing reactive functional groups,
   (b) a curing agent having functional groups that are reactive with the reactive functional groups of (a).

3. The method of claim 2 in which the ionic film-forming resin contains cationic groups.

4. The method of claim 3 in which the cationic groups are selected from amine salt and sulfonium salt groups.

5. The method of claim 4 in which the ionic film-forming resin is a (meth)acrylic resin containing cationic groups and active hydrogen groups.

6. The method of claim 5 in which the curing agent is a polyisocyanate.

7. The method of claim 1 in which the inorganic particles have a particle size less than 1000 nanometers.

8. The method of claim 1 in which the inorganic particles have a Mohs' hardness value greater than 5.

9. The method of claim 1 in which the inorganic particles are colloidal silica.

10. The method of claim 1 in which the inorganic particles are present in the composition in amounts of 0.5 to 10 percent by weight based on total weight of the composition.

11. The method of claim 1 in which the surface active agent is a polysiloxane.

12. The method of claim 11 in which the polysiloxane has the following structural formula:

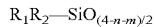

wherein each $R_1$ that may be identical or different is selected from H, OH, a monovalent hydrocarbon group or a monovalent siloxane group; each $R_2$ which may be the same or different is a group having at least one functional group reactive with the functional groups in the resinous binder; wherein $0<n<4$, $0<m<4$ and $2\leq(m+n)<4$.

13. The method of claim 11 in which the polysiloxane has the following structural formula:

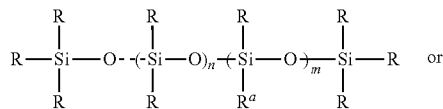 or

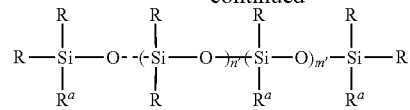

wherein:

m has a value of at least 1;

m' ranges from 0 to 75;

n ranges from 0 to 75;

n' ranges from 0 to 75;

each R, which may be identical or different, is selected from H, OH, monovalent hydrocarbon groups, monovalent siloxane groups, and mixtures of any of the foregoing; and $R^a$ comprises the following structure:

wherein $R^3$ is selected from an alkylene group, an oxyalkylene group, an alkylene aryl group, an alkenylene group, an oxyalkylene group, and an alkenylene aryl group; and X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

14. The method of claim 1 in which the surface active agent is present in the composition in amounts of 0.5 to 10 percent by weight based on weight of solids in the composition.

* * * * *